United States Patent
De Sadeleer

(10) Patent No.: US 6,818,245 B1
(45) Date of Patent: Nov. 16, 2004

(54) DEVELOPMENT OF VITAL WHEAT GLUTEN IN NON-AQUEOUS MEDIA

(75) Inventor: Jos Willy Ghislain Corneel De Sadeleer, Holsbeek (BE)

(73) Assignee: Cerestar Holding B.V., LA Sas van Gent (NL)

(*) Notice: Subject to any disclaimer, the term of this patent is extended or adjusted under 35 U.S.C. 154(b) by 263 days.

(21) Appl. No.: 09/612,238

(22) Filed: Jul. 7, 2000

(30) Foreign Application Priority Data

Jul. 7, 1999 (GB) .............................................. 9915787

(51) Int. Cl.$^7$ .................................................. A23J 1/12
(52) U.S. Cl. .......................... 426/656; 426/519; 426/3
(58) Field of Search .............................. 426/3, 656, 519

(56) References Cited

U.S. PATENT DOCUMENTS

| | | | |
|---|---|---|---|
| 3,692,535 A | 9/1972 | Norsby et al. | |
| 3,814,815 A | 6/1974 | Hashimoto et al. | 426/3 |
| 5,366,740 A | 11/1994 | Shaw et al. | 426/3 |
| 5,424,081 A | 6/1995 | Owusu-Ansah et al. | 426/4 |
| 5,603,977 A * | 2/1997 | Kobayashi et al. | 426/658 X |
| 5,665,152 A | 9/1997 | Bassi et al. | 106/145.1 |
| 5,858,423 A * | 1/1999 | Yajima et al. | 426/656 X |
| 5,945,142 A | 8/1999 | Patel et al. | 426/3 |

OTHER PUBLICATIONS

Patent Abstracts of Japan vol. 017, No. 663 (C–1138), Dec. 8, 1993 & JP 05 219891 A (Takasagi International Corporation), Aug. 31, 1993 *abstract*.

* cited by examiner

*Primary Examiner*—Arthur L. Corbin
(74) *Attorney, Agent, or Firm*—Fitch, Even, Tabin & Flannery

(57) ABSTRACT

The present invention relates to the development of vital wheat gluten in non-aqueous media. The gluten which have been developed in such a way can easily be stored for a prolonged period. The gluten are used in the preparation of chewable consumable products, or in processed food and feed.

7 Claims, 1 Drawing Sheet gluten 50 %
glycerol 50 %
H₂O 15 %

DEVELOPMENT OF VITAL WHEAT GLUTEN IN NON-AQUEOUS MEDIA

TECHNICAL FIELD

The present invention relates to the development of vital wheat gluten in non-aqueous media. The gluten which have been developed in such a way can easily be stored for a prolonged period of time under ambient storing conditions. The gluten are used in the preparation of chewable consumable products, they are also used in processed foods and feeds.

BACKGROUND OF THE INVENTION

Conventional chewing gums have achieved a broad success in the marketplace. Such chewing gums are typically made of a gum base and a coating. Both of these parts further contain compounds, which act as sweeteners, colourants, flavours, preservatives and processing aids. Such ingredients also serve to modify the bite and taste of the product:

Conventional gum bases may be chosen from natural or synthetic resins such as chicle, natural rubber, guttapercha, lechi capsi, sorva, gunakay, crown gum, butadiene-styrene copolymers, polyisobutylene, isobutylene-isoprene copolymers, polyvinyl acetate, and polyvinyl alcohol. The gum base, which is water insoluble and chewable further comprises elastomers, resins, fats, oils, waxes, softeners and fillers. As a softener or plasticiser the following molecules can be used lanolin, propylene glycol, glycerine or triacetin in amounts of up to 10 weight %. Other additives include fillers and anti-sticking agents.

The products used as basic ingredient for the gum base are not biodegradable and do not degrade upon chewing either. This distinguishes the chewing gum from the chewy candies, which are completely digestible. Disposal of conventional chewing gum can cause unsightly litter.

Wheat gluten has been tried as a digestible and biodegradable alternative to the mentioned gum base ingredients. In addition to their being biodegradable when discarded the gluten, because they are proteins, are not harmful to the human body should they be swallowed. To the contrary, gums based on or including gluten would be nutritious.

U.S. Pat. No. 3,814,815 describes a method of manufacturing a gum base in which gluten are denatured by more than 10% and preferably between 10 and 60%. Denaturation is described to be performed in an excess of water either by heating or freezing. International patent application WO 95/12322 discloses the use of gluten as a gum base for chewing gum. In order to improve the chewability characteristics the gluten are cross-linked with a protein condensing agent, preferably tannin. It is recognized that the gluten-based chewing gums have a high moisture content, which renders the gums susceptible to microbial spoilage. In order to avoid this spoilage preservatives are added.

WO 94/17673 describes an improvement in the chew of gluten when used as a gum base wherein the improvement consists in the addition of a texturizing agent.

U.S. Pat. No. 3,692,535 relates to the preparation of ready-to-bake pie crust. The pie crust is said to be shelf stable without refrigeration and can be rolled or otherwise handled without crumbling or breaking. As indicated in the description (col.2, lines 3–21) the complete flour is developed in water. This necessitates the addition of preservatives to inhibit microbial growth.

U.S. Pat. No. 5,366,740 relates to the use of a combination of spray dried and flash dried gluten as a chewing gum base.

U.S. Pat. No. 5,665,152 relates to the forming of solid, non-edible biodegradable, grain protein-based articles.

U.S. Pat. No. 5,945,142 relates to the addition of small amounts of gluten to the norma chewing gum base in order to reduce the squeakiness.

Despite the fact that gluten have found acceptance in a wide range of applications gluten have to date not gained a reasonable markets share in food or feed applications. In the chewing gum field the use of gluten has been hampered by a number of organoleptic factors and no gluten based chewing gum has gained wide acceptance in the market, regardless of the advantages of degradability and edibility of the gluten.

In addition to the organoleptic factors one of the reasons therefore is the wide-spread belief that it is necessary to develop the gluten in an aqueous medium. Development in an aqueous medium results in the presence of too much water in the final product, which makes the product perishable due to the growth of microorganisms. The present invention solves this problem.

SUMMARY OF THE INVENTION

An object of the present invention is to produce a digestible, degradable gluten basic composition, which can be stored for a prolonged period of time without degradation and which can be used as a gum base for chewing gums, chewable candies, and process food or feed. The storage conditions are the normal storage conditions for gluten.

The present invention discloses a developed vital wheat gluten wherein the development was performed in a non-aqueous medium i.e. a medium having a Aw of less then 0.8, or with a Aw so that the final composition has a Aw less than 0.7.

A preferred medium for developing the gluten is a concentrated carbohydrate solution, containing less than 30% of water, preferably less than 20%, more preferably less than 10% (w/w).

The present invention also discloses a method for developing wheat gluten in a non-aqueous medium. The method comprises the steps of mixing gluten 20–60% (d.s. w/w) with a non-aqueous medium, kneading the mixture at a temperature of between 50 and 90°C., continuing the kneading until the value of at least 75% of the maximal torque is reached, shaping the gluten into a desired form.

The present invention further discloses the use of the so-developed wheat gluten as a gum base for chewing gums, or as basis for chewing candies.

Wheat gluten developed in non-aqueous media has been applied in food applications but also in bakery and processed food. The wheat gluten was further applied in feed applications such as in pet food or fish feed.

DETAILED DESCRIPTION OF THE INVENTION

Figure 1:
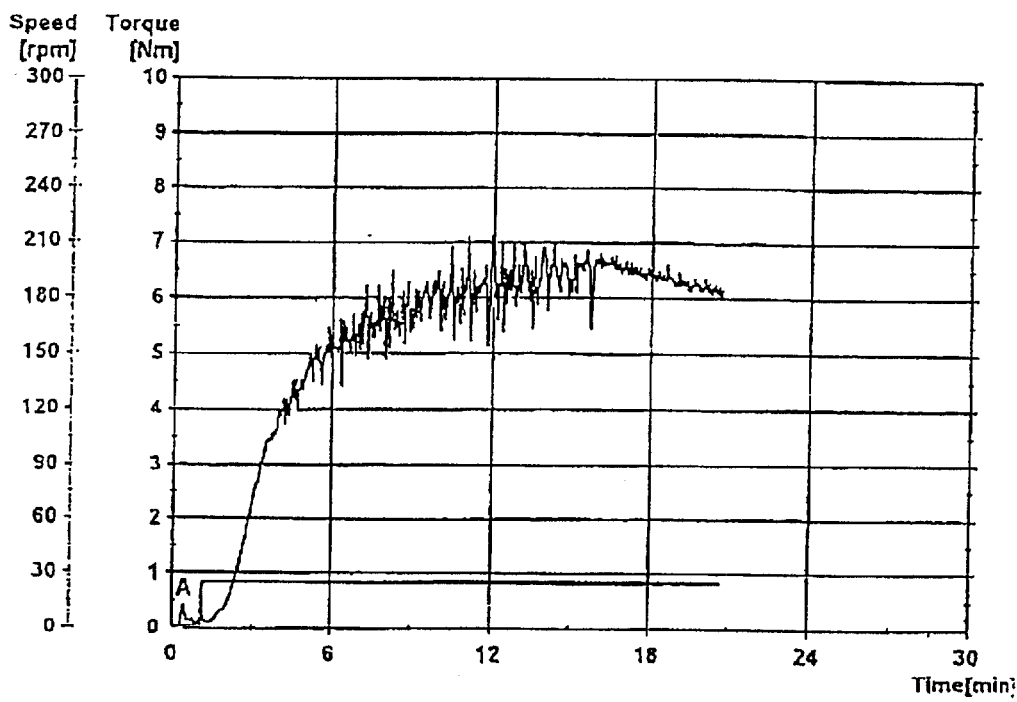
FIG. 1 shows a Brabender Plastogram recorded on a Do-Corder DC 2200-3 (Brabender OHG, Duisburg), expressing the evolution of the torque (Nm) as a function of time when kneading a mixture of gluten-glycerol-water (50:50:15) at 58° Celsius and 25 rpm.

It is an object of the present invention to provide a digestible, degradable gluten basic composition, which can be stored for a prolonged period of time without degradation and which can for example be used as a gum base for chewing gums or chewable candies. The present invention discloses a developed vital wheat gluten wherein the development was performed in a non-aqueous medium i.e. a medium having a Aw (water activity) of less than 0.8, so that the final composition has a Aw of less than 0.7.

In general terms, wheat gluten can be developed by mixing a high concentration of vital wheat gluten with a non-aqueous medium of choice. Kneading this mixture is continued until a torque is maximal (see FIG. 1). It is especially at the maximum value of this torque that a product is obtained that has excellent chewing properties. The product can now be used as a gum base. When mixing is stopped before the maximum value, or beyond the maximum value, the product will be more suitable for applications in chewy candy, in processed food, or in feed applications (including pet food). In general we have found that the kneading is to continue until at least 75% of the maximum torque value is reached (note that this can be before or after the maximum value), preferably until at least 85% is reached.

Since the wheat gluten is developed in a non-aqueous medium, the developed wheat gluten product is stable towards microbial degradation and can be stored for several months without deterioration, under normal storage conditions. This greatly adds to the flexibility of the use of vital wheat gluten.

In a typical preparation the kneading is performed at a temperature between 50 and 90° C. The essence of the kneading is that sufficient energy has to be added to allow the gluten to unfold, and restore their interactions i.e. H-bridges, hydrophobic and ionic bonds, sulpher bridges and crosslinks. This means that there is some flexibility as to the type of kneader (type, continuous or batch, extruder etc.) and the conditions under which the kneader is employed. This is what is understood by developing according to the present invention. Unfolding and restoration of interactions is not accompanied by a substantial breakdown of the primary structure of the proteins. Such a process is called denaturation and that is not desirable at least not to an extensive degree in the present case.

The evolution of the torque (time to maximum) and the height of the torque can be influenced by altering the conditions of the kneading, i.e. temperature, speed of kneading, inclusion of other ingredients or additives, etc. Some of these parameters are illustrated in the examples.

Kneading times are typically between 5 min and 1 hour preferably between 10 and 25 minutes. It should be kept in mind that what counts is the energy transfer properties of the mixer. Where an extruder is used the treatment time is in the order of seconds. Although the present invention relates to the absence of water typically up to about 20% of water may be present. The limits for this are determined by the fact that the water activity (Aw) has to be such that microbial growth is not possible. This water activity limit depends to a certain extent on the type of microorganism.

In addition it should be noted that in the presence of water kneading becomes easier. A preferred medium is a concentrated carbohydrate solution, containing less than 30% of water, preferably less than 20%, more preferably less than 10% (w/w). The amount of water, which is present during kneading influences the kneading conditions. Kneading becomes easier in the presence of water. In fact what is essential for the present invention is the water activity of the final product.

The gluten used in the present invention can be from any cereal source, advantageously they are wheat gluten and most preferred are the vital wheat gluten. It is possible to combine gluten from different sources and it is also possible to use partially vital gluten.

After development of the gluten, it can be shaped in or to a desired form. It can be moulded or forced through a die. Additional components and ingredients are added depending on the type of product which is to be obtained.

The present invention discloses the use of the so-developed wheat gluten as a gum base for chewing gums or chewing candies. The wheat gluten has been applied in food applications including in bakery and processed food. The wheat gluten was air further applied in feed applications such as in pet food. In such cases it may be necessary to process the gluten by cooking, baking or other means.

EXAMPLES 1. 50 g vital wheat gluten (94% dry substance (Gluvital® 21000)) were mixed with 50 g glycerol and 10 g of water, and kneaded in a Do-Corder (Brabender, Duisburg, 50 g bowl) at 58° C. at 25 rpm. After 1 minute the torque increased, and reached a maximum of 8.5 Nm after 13 min, after which it started declining (see FIG. 1). The product recovered when kneading up to the top of the development curve has excellent chewing properties and can be used as gum base for e.g. chewing gum formulas.

2. 50 g vital wheat gluten (94% dry substance (Gluvital® 21000)) were mixed with 50 g glycerol and 6 g lecithin (Stem, Hamburg), and kneaded in a Do-Corder at 58° C. at 25 rpm. After 4 minute the torque increased, and reached a maximum of 4.5 Nm after 18 min, after which it started declining. The product recovered when kneading up to the top of the development curve has excellent chewing properties and can be used as gum base for e.g. chewing gum formulas. The product was stable towards microbiological degradation, and was stored for several months.

3. 50 g vital wheat gluten (94% dry substance (Gluvital® 21000)) were mixed with 50 g glycerol, and 15 g water, and kneaded in a Do-Corder at 58° C. at 25 rpm. After 2 minutes the torque increased, and reached a maximum of 6.5 Nm after 15 min, after which it started declining. The consistency of the product is higher than in example 1, and a different 'bite' was obtained. The water activity was still low enough to avoid microbiological degradation of the product.

4. 50 g vital wheat gluten (94% dry substance (Gluvital 21000)) were mixed with 50 g glycerol, and 5 g water, and kneaded in a Do-Corder at 58° C. and a speed of resp. 25, 50, 100 and 160 rpm. It was found that the time to reach the high torque declines with increasing mixer speed.

5. 50 g vital wheat gluten (94% dry substance (Gluvital 21000)) were mixed with 81.25 g (80% dry substance) glucose syrup (CISweet™ D 01608, Cerestar), 18.75 g water, 1 g of lecithin, 3 g of cocosfat, 10 g of tapioca starch in the 50 g bowl of the Do-Corder at resp. 40. 60 and 80° C., at 150 rpm. Increasing the temperature hardly influences the level of the maximum torque, but drastically influences the time at which this maximum is reached.

6. 50 g vital wheat gluten (94% dry substance (Gluvital 21000)) were mixed with 81.25 g (80% dry substance) glucose syrup (CISweet D 01608, Cerestar), 18.75 g water, 1 g of lecithin, and 3 g of cocosfat in the 50 g bowl of the Do-Corder at 58° C. and kneaded at 150 rpm. The product was a directly consumable chewable product.

7. 50 g vital wheat gluten (94% dry substance (Gluvital 21000)) were mixed with 81.25 g (80% dry substance)

glucose syrup (CISweet D 01608, Cerestar), 18.75 g water, 1 g of lecithin, 3 g of cocosfat, 10 g of rice flour and 0.1 g of mint flavour in the 50 g bowl of the Do-Corder at 58° C. and 150 rpm. The maximum torque is the same as without the filler (rice flour), but the maximum is reached after a shorter time, due to the higher dry substance of the mixture. The product was a directly consumable chewable product.

8. A product was produced as in example 6, and after kneading to its maximal torque it was shaped after which it was fried yielding snacks.

A part of the same product was baked (conventional, microwave or combi-oven) yielding nice bakery products with baguette-like crumb structure.

9. 40 g vital wheat gluten (94% dry substance (Gluvital 21000)) were mixed with 40 g of dried (96% dry substance) corn germs (40% oil) and 25 g of water, and kneaded in the 50 g bowl of the Do-Corder at 58° C. and 25 rpm. A nutritionally excellent product is generated for pets that easily can be further processed cooked, fryed, baked, sterrilised in cans, etc. It is also an excellent fish feed, both through its composition (high protein, high fat, low carbohydrates) and its properties (consistant mass that is not desintegrating when dropped in water).

10. 50 g of vital wheat gluten 94% dry substance (Gluvital 21000) were mixed with 50 g of corn gluten (88% dry substance) and 25 g of water in the 50 g bowl of the Do-Corder at 58° C. and 25 rpm. A nice, nutritionally very interesting product was obtained that can be shaped and further processed through the normal processes applied in pet food, animal feed and fish feed.

| example | onset development (min) | maximum torque (Nm) | time to maximum (min) | time to 9 Nm (min) |
| --- | --- | --- | --- | --- |
| 1 | 1 | 8.5 | 13 | |
| 2 | 4 | 4.5 | 18 | |
| 3 | 2 | 6.5 | 15 | |
| 4 (25 rpm) | 5 | | | 21 |
| 4 (50 rpm) | 3 | | | 13.5 |
| 4 (100 rpm) | 2 | | | 12 |
| 4 (160 rpm) | 1 | | | 5.5 |
| 5 (40° C.) | 4 | 3.5 | 58 | |
| 5 (60° C.) | 3 | 3.5 | 11 | |
| 5 (80° C.) | 2 | 3 | 6 | |
| 6 | 9 | 3.5 | 19 | |
| 7.8 | 4 | 4 | 12 | |
| 9 | 1 | 4 | 10 | |
| 10 | 1 | 5 | 3 | |

11. 1 kg of vital gluten (94% dry substance (Gluvital 21000)) were mixed with 1.625 kg (80% dry substance) glucose syrup (C*Sweet D 01608, Cerestar), 0.375 kg of water, 0.2 kg of rice flour, 20 g of lecithin and 60 g of cocosfat in a Z-blade mixer at 58° C. 500 ppm calcium peroxide and 500 ppm of tannin were added as crosslinking agents. The energy transfer of this mixer was lower than that of the Do-Corder, which resulted in times to optimal development (maximal torque) of 25 min. 2 min. before reaching the maximum 10 ml of mint flavour were added. At the maximum torque the kneading was stopped and the product shaped: first laminated to sheets of different thickness (resp. 3, 5 and 8 mm), and cut into desired forms. The products could be easily sanded and coated: for sanding the products were damped with steam, and dropped in fine sugar, dextrose, or any other powder used for this purpose. The coating process was executed with sucrose (66° Brix) or dextrose solutions (48% solids) to which flavour (peach, lemon etc.) was added. The products were put on sieves or screens, and the coating in a solution poured on it. The products could be consumed as chewing gums.

12. 1 kg of vital gluten (94% dry substance (Gluvital 21000)) were mixed with 1.625 kg (80% dry substance) glucose syrup (C*Sweet D 01608, Cerestar), 0.2 kg of water, 0.09 kg of glycerol, 0.2 kg of rice flour, 20 g of lecithin and 60 g of cocosfat in a Z-blade mixer at 58° C. 500 ppm calcium peroxide and 500 ppm of tannin were added as crosslinking agents, together with 35 ml of a 50% sodium citrate solution and 1 ml of yellow colour. The energy transfer of this mixer was lower than that of the Do-Corder, which resulted in times to optimal development (maximal torque) of 25 min. 2 min before reaching the maximum 15 ml of orange flavour were added. At the maximum torque the kneading was stopped and the product shaped: first laminated to sheets of different thickness (resp. 3. 5 and 8 mm), and cut into desired forms. The products could be easily sanded and coated as described in example 11. The products could be consumed as chewing gums.

13. 1 kg of vital gluten (94% dry substance (Gluvital 21000)) were mixed with 1.625 kg (80% dry substance) glucose syrup (C*Sweet D 01608, Cerestar), 0.2 kg of water, 0.09 kg of glycerol, 0.2 kg of rice flour, 20 g of lecithin and 60 g of cocosfat in a Z-blade mixer at 58° C. 500 ppm calcium peroxide and 500 ppm of tannin were added as crosslinking agents, together with 35 ml of a 50% sodium citrate solution and 1 ml of yellow colour. The energy transfer of this mixer was lower than that of the Do-Corder, which resulted in times to optimal development (maximal torque) of 25 min. 2 min before reaching the maximum 15 ml of orange flavour were added. 5 min after the maximum torque was reached, the kneading was stopped and the product shaped: first laminated to sheets of different thickness (resp. 3. 5 and 8 mm), and cut into different forms. The products could be easily sanded and coated as described in Example 11. Very nice sweets with a chewy candy texture were obtained. The tests were repeated at higher temperatures (85° C.). The resulting products had a harder texture.

14. 3 kg of vital gluten (94% dry substance (Gluvital 21000)) were mixed with 4.875 kg (80% dry substance) glucose syrup (C*Sweet D 01608, Cerestar), 1.125 kg of water, 0.6 kg of rice flour, 60 g of lecithin and 180 g of cocosfat in a large Z-blade mixer at 58° C. 1% of iron(III)oxide were added as colouring agent. The energy transfer of this mixer was identical to that of the Do-Corder, i.e. development time was only 15 min. 2 min before reaching the maximum 12 meat bouillon cubes were added After the kneading the mass was divided in different lumps. After cooling down the mass hardened, looked as a roast beef, and could be easily sliced. Other lumps were laminated and cut into small cubes (0.5*0.5*0.5 cm$^3$) for pet food applications (cats). We also shaped lumps into beef steak like mass. The tests were repeated with different colouring levels (resp. 0.25 and 0.1% iron oxide), and different favours (e.g. 0.1% chicken extract). The products were very much appreciated by dogs.

After cooking the texture is close to that of boiled meat.

15. 3 kg of vital gluten (94% dry substance (Gluvital 21000)) were mixed with 4.875 kg (80% dry substance) glucose syrup (C*Sweet D 01608, Cerestar), 1.125 kg of water, 0.6 kg of rice flour, 60 g of lecithin and 180 g of cocosfat in a large Z-blade mixer at 58° C. When all ingredients were well mixed, the mass was transferred to a pilot plant extruder (Clextral) with a screw configuration that correctly developped the gluten. The hardness and texture of the products varied with the kneading temperature: at 85° C. exit temperature the product was a very soft, white-yellow dough that hardened on cooling down. Depending on the configuration of the exit of the extruder (die shape and diameter, cutting knife etc.) different shaped products could be produced. Also moulding of the mass into different forms was possible. The structure of the product varied with varying screw configuration: intensifying the kneading induced the formation of fibre-like structures. At temperatures above 100° C. the products became crumble, but hardened on cooling down, yielding snack-like products. Here too, the final shape could be adapted by changing the extruder die.

What is claimed is:

1. A method for developing wheat gluten comprising:
   (a) mixing a vital wheat gluten 20–60% (d.s. w/w) with a nonaqueous medium that contains less than 20% of water;
   (b) kneading the mixture in a kneader at a temperature of between 50° C. and 90° C.;
   (c) continuing the kneading in the kneader until a value representing at least 75% of the maximal torque for kneading the mixture in the kneader is reached; and
   (d) shaping the developed gluten into a desired form.

2. A method according to claim 1, wherein the non-aqueous medium contains less than 15% water.

3. A method according to claim 2, wherein the non-aqueous medium contains less than 10% water.

4. A method according to claim 1, wherein the water activity of the non-aqueous medium is below 0.8.

5. A method according to claim 1, wherein said method is conducted whereby the developed gluten product has a water activity such that microbial growth is not possible.

6. A method according to claim 1, wherein the kneading is halted after 75% of the value representing at least 75% of the maximal torque is reached.

7. A method according to claim 1, wherein other ingredients are added to the gluten during a later stage of the kneading, or before, during or after shaping.

* * * * *